US012753753B2

(12) United States Patent
Batho et al.

(10) Patent No.: US 12,753,753 B2
(45) Date of Patent: Oct. 6, 2026

(54) DEEPWATER RESONATOR ARRAY FOR SUBSEA NOISE MITIGATION

(71) Applicant: Chevron U.S.A. Inc., San Ramon, CA (US)

(72) Inventors: Peter F. Batho, Houston, TX (US); Mark S. Wochner, Pittsford, NY (US); Preston S. Wilson, Austin, TX (US); Kevin M. Lee, Austin, TX (US); Andrew R. McNeese, Austin, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 274 days.

(21) Appl. No.: 18/597,826

(22) Filed: Mar. 6, 2024

(65) Prior Publication Data

US 2025/0283462 A1 Sep. 11, 2025

(51) Int. Cl.
*F04B 53/00* (2006.01)
*G10K 11/172* (2006.01)

(52) U.S. Cl.
CPC .......... *F04B 53/004* (2013.01); *G10K 11/172* (2013.01)

(58) Field of Classification Search
CPC ............................ G10K 11/172; F04B 53/004
USPC .......................................................... 181/182
See application file for complete search history.

(56) References Cited

U.S. PATENT DOCUMENTS 8,387,746 B2 * 3/2013 Parkin .................... A01K 61/00 181/290
8,500,369 B2 * 8/2013 Mohr ........................ E02D 7/02 181/198
8,689,935 B2 4/2014 Wilson
8,820,472 B2 * 9/2014 Jung ........................ E02B 17/00 181/198
9,343,059 B2 5/2016 Wilson
9,410,403 B2 * 8/2016 Wochner ............. E21B 41/0007
9,488,026 B2 * 11/2016 Wochner .............. G10K 11/172
9,607,601 B2 3/2017 Wilson
9,812,112 B2 * 11/2017 Wochner .............. G10K 11/172
12,049,799 B2 * 7/2024 Batho ................. E21B 41/0007

(Continued)

FOREIGN PATENT DOCUMENTS

KR 20160002250 U * 6/2016 ............. B63B 27/00

OTHER PUBLICATIONS

PCT International Search Report and Written Opinion mailed on Apr. 18, 2025, issued in International Application No. PCT/US2025/018361, filed on Mar. 4, 2025, 17 pages.

*Primary Examiner* — Forrest M Phillips
(74) *Attorney, Agent, or Firm* — Avery L. Cate

(57) ABSTRACT

A subsea oil and/or gas facility includes rotating equipment/machinery located subsea and configured for subsea use. The rotating equipment/machinery includes pumping equipment/machinery having one or more pumps, or compression equipment/machinery having one or more compressors, or both, for processing oil and/or gas generated by the subsea oil and/or gas facility. The subsea oil and/or gas facility also includes a noise mitigation system configured for deepwater use and configured to mitigate noise generated by the rotating equipment/machinery. The noise mitigation system includes a deepwater resonator array configured for deepwater use and including an array of resonators filled with gas to mitigate the noise.

21 Claims, 4 Drawing Sheets

(56) References Cited

U.S. PATENT DOCUMENTS

| | | | | |
|---|---|---|---|---|
| 2005/0083783 | A1* | 4/2005 | Baskerville | E02D 13/00 367/1 |
| 2005/0283276 | A1* | 12/2005 | Prescott | E21B 47/06 700/282 |
| 2012/0097476 | A1* | 4/2012 | Jung | E02D 7/14 181/196 |
| 2013/0056270 | A1* | 3/2013 | Ward | E21B 41/0007 175/5 |
| 2015/0078833 | A1* | 3/2015 | Elmer | E02D 13/005 405/195.1 |
| 2015/0170631 | A1 | 6/2015 | Wochner | |
| 2015/0191987 | A1 | 7/2015 | Wochner | |
| 2019/0040718 | A1 | 2/2019 | Homstvedt | |
| 2023/0184047 | A1 | 6/2023 | Batho | |

* cited by examiner

DEEPWATER RESONATOR ARRAY FOR SUBSEA NOISE MITIGATION

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Subsea noise, its sources and impacts are being increasingly scrutinized by non-governmental organizations and regulators. Noise emissions from shipping, defense and other operations and their consequences are being increasingly documented and understood. The development of subsea oil and/or gas facilities and resultant deployment of underwater production trees, machinery and processing equipment on the seabed may generate long-term lower frequency noise that is transmissible over long distances. It may be desirable to reduce the noise output of such equipment.

SUMMARY OF THE INVENTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with aspects of the disclosure, a subsea oil and/or gas facility includes rotating equipment/machinery located subsea and configured for subsea use. The rotating equipment/machinery includes pumping equipment/machinery having one or more pumps, or compression equipment/machinery having one or more compressors, or both, for processing oil and/or gas generated by the subsea oil and/or gas facility. The subsea oil and/or gas facility also includes a noise mitigation system configured for deepwater use and configured to mitigate noise generated by the rotating equipment/machinery. The noise mitigation system includes a deepwater resonator array configured for deepwater use and including an array of resonators filled with gas to mitigate the noise.

In accordance with another aspect of the disclosure, a method of mitigating long-term noise produced in a subsea oil and/or gas facility is provided. The subsea oil and/or gas facility includes rotating equipment/machinery located subsea and configured for subsea use. The rotating equipment/machinery includes pumping equipment/machinery having one or more pumps, or compression equipment/machinery having one or more compressors, or both, for processing oil and/or gas generated by the subsea oil and gas facility. The method includes securing a deepwater resonator frame to a support frame of the rotating equipment/machinery, the deepwater resonator frame being attached to a deepwater resonator array including an array of resonator cups formed within resonator panels, the resonator cups being capable of being filled with gas. The method also includes filling the resonator cups with a gas to form resonators, the resonators being configured to mitigate noise generated by the rotating equipment/machinery during operation. Securing the deepwater resonator frame to the support frame places the deepwater resonator array sufficiently proximate the rotating equipment/machinery to enable resonators of the deepwater resonator array to mitigate the noise generated by the rotating equipment/machinery during operation.

BRIEF DESCRIPTION OF DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF THE INVENTION

Figure 1:
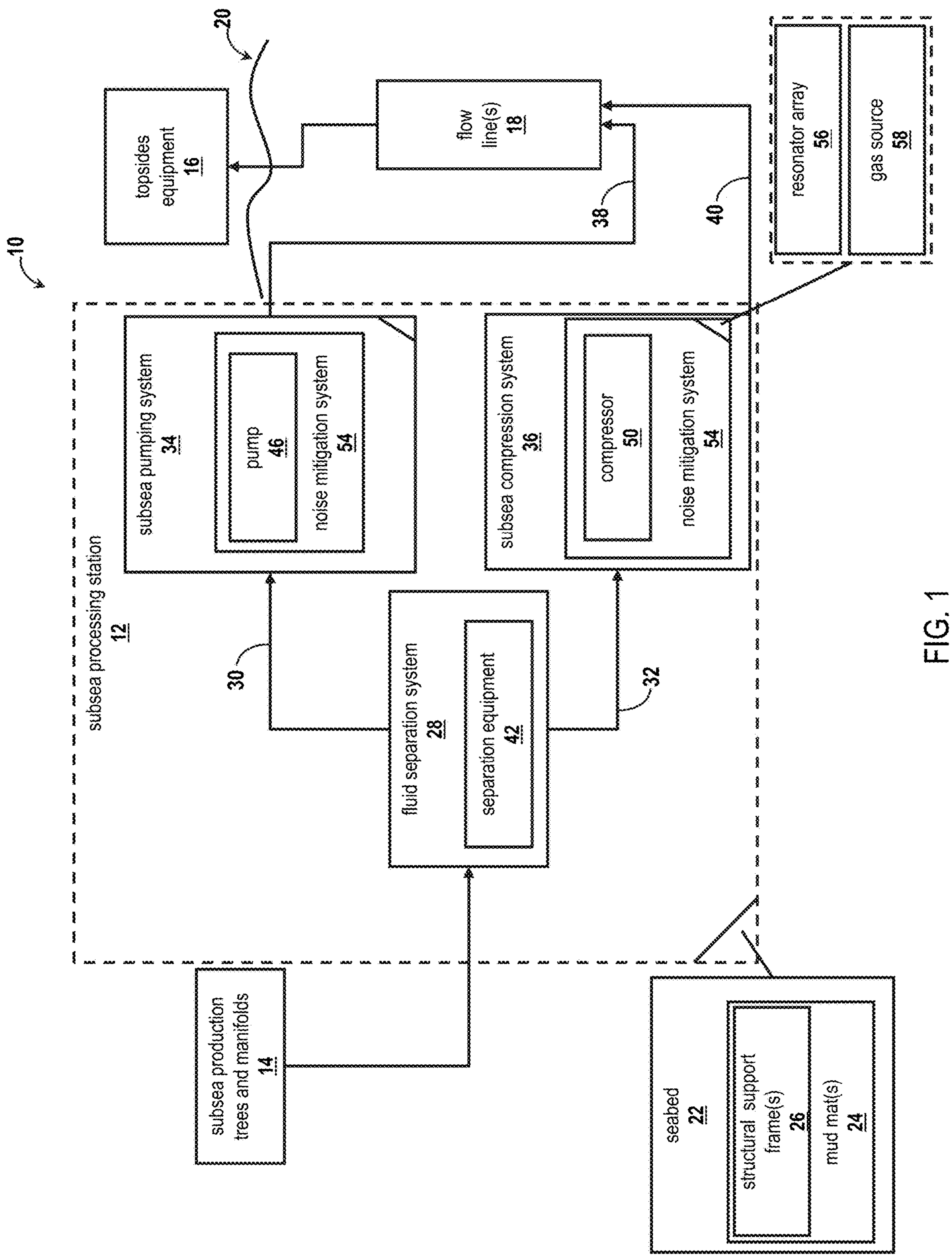
FIG. 1 is a block diagram of an example oil and/or gas facility utilizing a deepwater resonator array to mitigate noise associated with subsea equipment/machinery of the facility, in accordance with an embodiment of this disclosure.

As set forth above, it may be desirable to mitigate noise generated by any one or a combination of underwater production trees, machinery and processing equipment on the seabed. In accordance with embodiments of this disclosure, gas bubble based acoustic resonators (e.g., Helmholtz resonators), for example as disclosed in U.S. Pat. Nos. 8,689,935, 9,343,059, 9,488,026, and 9,607,601, which are incorporated by reference herein in their entirety, are adapted from shallow water use (e.g., 50 meters or less) to a deep water application (e.g., at least 1000 m) by encapsulating gas filled resonators arranged in an array—hereinafter referred to as a deepwater resonator array. The array may be, for example, a mesh or network of inverted cups that are at least partially filled with gas, creating gas voids that are specifically tuned to address specific frequencies of concern emitted from the equipment/machinery at a particular installation depth. The equipment/machinery that emits the frequencies of concern may include, by way of non-limiting example, rotating equipment/machinery such as a compressor module or pump module that are a part of a subsea installation.

The noise mitigation techniques described herein may be associated with prior or concurrent installation of pumping and compression equipment where sound (e.g., low frequency sound, medium frequency sound, high frequency sound, or any combination) is produced. A specific example is the use of the present noise mitigation techniques on a compression system and/or a pumping system deployed in subsea hydrocarbon production facilities (i.e., subsea oil and/or gas production facilities). Further, the noise mitigation techniques described herein may be performed over a long period of time, such that the equipment used to employ such techniques has a design and functional life on the order of, for example, 25-50 years. This is referred to as a "long-term" operational life or deployment as used in this disclosure.

Thus, in certain embodiments, the present disclosure includes the use of the disclosed deepwater resonator array to mitigate certain types of noise (e.g., low frequency noise, medium frequency noise, high frequency noise, or any combination thereof) produced by subsea oil and/or gas facilities. The deepwater resonator array may be used to mitigate noise associated with, for instance, deep-water pumping and compression equipment. This may be done by installing one or more of the deepwater resonator arrays at specific equipment locations. As discussed in further detail below, a number of approaches may be used to place the resonators in an arrangement that allows noise mitigation. For example, in some embodiments the resonator arrays may be positioned around (e.g., about, surrounding) at least a portion of the equipment which is the source of the noise to be mitigated (the equipment noise source) via a frame that holds the resonator arrays. Additionally or alternatively, in some embodiments the resonator arrays may be removably coupled to a support structure of the equipment noise source. In a still further embodiment, the resonator arrays may be contained in a flexible jacket or sleeve configured to be placed around the exterior of the equipment noise source.

The embodiments of this disclosure may encompass a variety of configurations, an example of which is depicted in FIG. 1, which is a block diagram of a subsea oil and/or gas facility 10. In FIG. 1, the subsea oil and/or gas facility 10 is an oil and/or gas production system (a hydrocarbon production system) utilizing subsea equipment with noise mitigation features, all of which is configured for deepwater use. In the illustrated embodiment, the subsea oil and/or gas facility 10 includes a subsea processing station 12 that processes production fluids (e.g., oil, gas, or a mixture thereof) received from subsea production trees and manifolds 14. The processed production fluids generated by the subsea processing station 12 are transmitted to topsides equipment 16 by one or more flow lines 18 that cross a water line 20 (e.g., a shoreline or to a topside facility). The topsides equipment 16 may include, by way of non-limiting example, a liquefied natural gas (LNG) plant, a gathering and separation facility, a petroleum-fired power plant, or the like. The subsea oil and/or gas facility 10 may also include certain supporting features that are not shown, such as umbilicals and a local field control station (FCS) or other facility or structure above the waterline. Umbilicals may be used to transmit electrical power and/or signals, hydraulic power and/or signals, or both, between the subsea production trees and manifolds 14, the subsea processing station 12, or a combination, and the FCS or other topside facility.

The subsea processing station 12 as illustrated is positioned on the seabed 22 via one or more structures. Such structures may include one or more mud mats 24 and one or more structural frames 26. The subsea processing station 12 may include one or more systems (or modules) that process produced fluids, such as by separation, pumping, and/or compression. The one or more systems may include rotating equipment/machinery located subsea and configured for subsea use. Such rotating equipment/machinery may include pumping equipment/machinery (e.g., a pumping module) having one or more pumps, or compression equipment/machinery (e.g., a compression module) having one or more compressors, or both, for processing oil and/or gas generated by the subsea oil and/or gas facility 10. The illustrated subsea processing station 12 includes a fluid separation system 28 configured to separate produced fluids into its liquid components 30 and gaseous components 32, a subsea pumping system 34 configured to pump the liquid components 30 and a subsea compression system 36 configured to compress the gaseous components 32. Pressurized liquid 38 from the subsea pumping system 34 and compressed gas 40 from the subsea compression system 36 are transmitted through the flow lines 18 to the topsides equipment 16. Although not shown, in some embodiments there may be flowlines that recycle at least a portion of the pressurized liquid 38 and the compressed gas 40 back to the fluid separation system 28.

Each of the systems illustrated include their respective components that process the produced fluids in the station 12. Specifically, the fluid separation system 28 includes separation equipment 42. The subsea pumping system 34 includes one or more subsea pumps 46 (which may be part of one or more pumping modules); and the subsea compression system 36 includes one or more subsea compressors 50 (which may be part of one or more compression modules). The systems are supported by one or more structural frames 26 and accordingly the one or more mud mats 24 to secure and support the mass of installed equipment.

To mitigate at least some of the noise generated by the subsea pumps 46 and/or subsea compressors 50, the station 12 may include a noise mitigation system 54 configured for deepwater use. The noise mitigation system 54 may be positioned in specific locations to disrupt sound waves generated by equipment/machinery noise at its source to avoid sound transmission over long distances—especially at lower frequencies. Various embodiments of the subsea oil and/or gas facility 10 may utilize any one or a combination of the noise mitigation systems 54 described herein. In the illustrated embodiment, the subsea compression system 36 includes one or more noise mitigation systems 54 located proximate (e.g., around) the subsea compressor(s) 50 (e.g., within the compression module assembly or on the subsea compressor housing).

During operation, the rotating equipment/machinery such as the pump(s) 46 and compressor(s) 50 produce noise, and it may be desirable to mitigate the noise produced by either or both of these. In accordance with the described embodiments, the subsea compression system 36 and the subsea pumping system 34 may each include one or more noise mitigation systems 54 located proximate (e.g., around) the equipment noise source (e.g., within the module assembly or on the subsea compressor/pump housing).

In accordance with present embodiments, the noise mitigation system 54 includes a deepwater resonator array 56 configured for deepwater use and comprising an array of resonators (e.g., an array of resonator cups) filled with gas to mitigate noise. The noise mitigation system 54 may also include a gas source 58 to fill the resonator cups. The gas source 58 may include one or more storage tanks, a device or system that performs water electrolysis, or a combination of these. Filling the cups of the resonator array 56 forms resonators that absorb or otherwise disrupt noise generated during operation of the subsea pump(s) 46 and/or the subsea compressor(s) 50. Although the components of the noise mitigation system 54 are only illustrated for the subsea compression system 36, it should be noted that in various different embodiments these components may be replicated for the subsea pump system 34, or may be utilized for both the subsea compression system 36 and the subsea pumping system 34, or may only be associated with the subsea pump system 34. In one particular embodiment, the subsea oil and/or gas facility 10 only includes the noise mitigation system 54 associated with the subsea compression system 36. The noise mitigation system 54 may be permanently installed for the operating life (which may be on the order of 25-50 years) of the rotating equipment/machinery for which it is mitigating noise.

The deepwater resonator array 56 of this disclosure may have any appropriate shape and material construction that is suitable for mitigating noise generated by the subsea equipment/machinery mentioned above and may depend on the configuration utilized. As the deepwater resonator array 56 is configured to be used in a subsea installation, the deepwater resonator array 56 may have a designed noise mitigation level at a water depth of at least 100 meters, at least 500 meters, at least 1000 meters, at least 1250 meters, at least 1500 meters, at least 2000 meters, or at least 2500 meters; for example between 1000 meters and 1500 meters, or between 2000 meters and 3200 meters. The deepwater resonator array 56 may be configured to mitigate noise at an operational ("dynamic") design temperature of 2° C. to 30° C. Such a temperature range may allow the deepwater resonator array 56 to be pre-installed on certain types of equipment before final deployment at their ultimate subsea location. In one non-limiting embodiment, the deepwater resonator array 56 may be configured to mitigate noise at an operational temperature of between 25° C. and 30° C. at an operational depth of between 100 m and 150 m. In another non-limiting embodiment, the deepwater resonator array 56 may be configured to mitigate noise at an operational temperature of between 3° C. and 5° C. at an operational depth of between 1200 m and 1500 m. In a further non-limiting embodiment, the deepwater resonator array 56 may be configured to mitigate noise at an operational temperature of between 3° C. and 5° C. at an operational depth of up to 3200 m.

The configuration of the deepwater resonator array 56 may include shape, thickness, and material construction selected such that the deepwater resonator array is configured to attenuate noise having particular frequencies, such as the low frequency portion of the spectrum, the medium frequency portion of the spectrum, the high frequency portion of the spectrum, or any combination thereof. Generally, the deepwater resonator array 56 may be configured to attenuate noise having a frequency ranging from 5 Hz to 10,000 Hz. In a first embodiment, at least one deepwater resonator array 56 is configured to mitigate noise output from one or more pumps, the noise having a range of between 40 Hz and 700 Hz. In a second embodiment, at least one deepwater resonator array 56 is configured to mitigate noise output from one or more compressors in a range of between 600 Hz and 2500 Hz.

Figure 2:
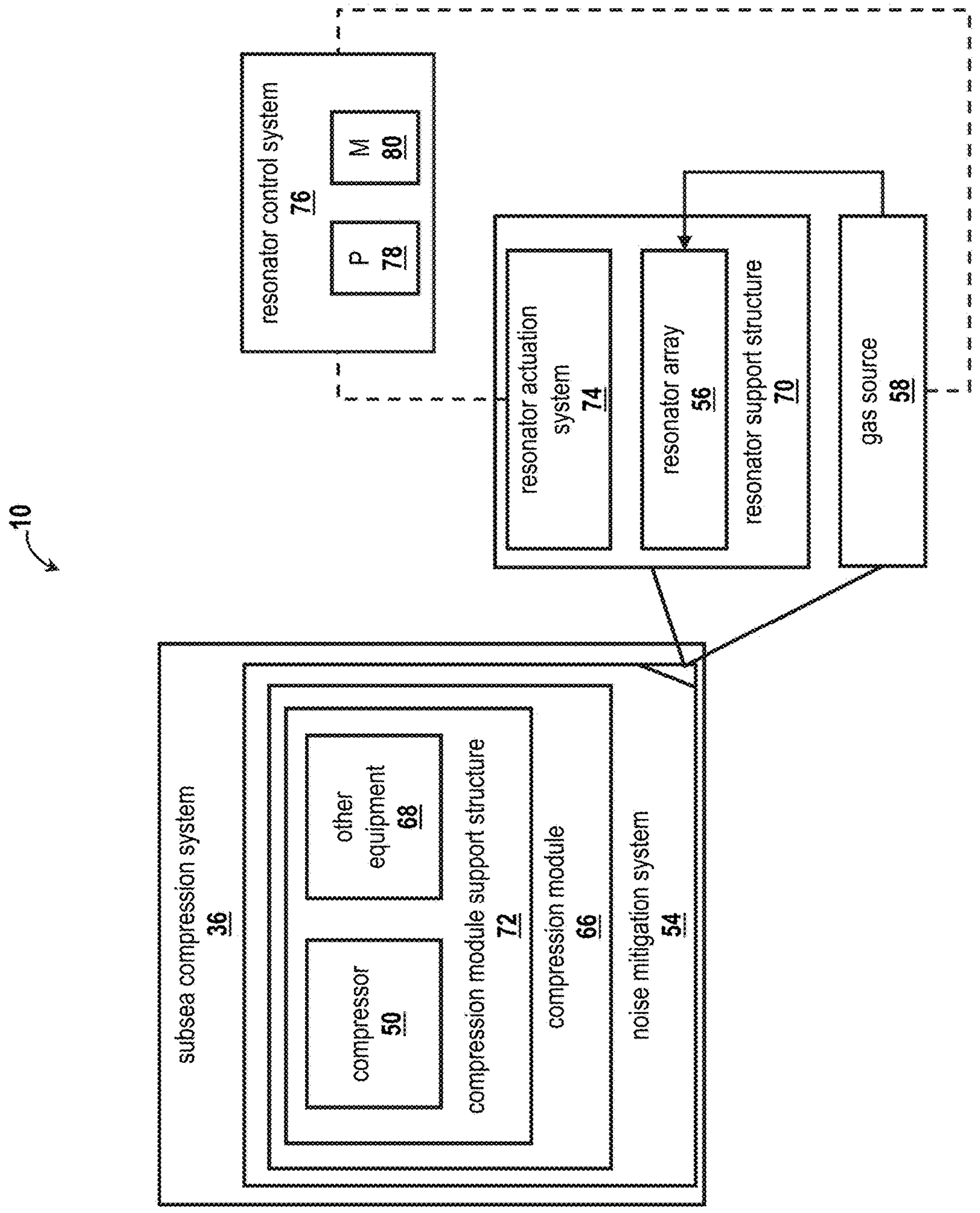
FIG. 2 is a block diagram of an example of the subsea compressor system of FIG. 1 having a deepwater resonator array and a resonator actuation system, in accordance with an embodiment of this disclosure.
Figure 3:
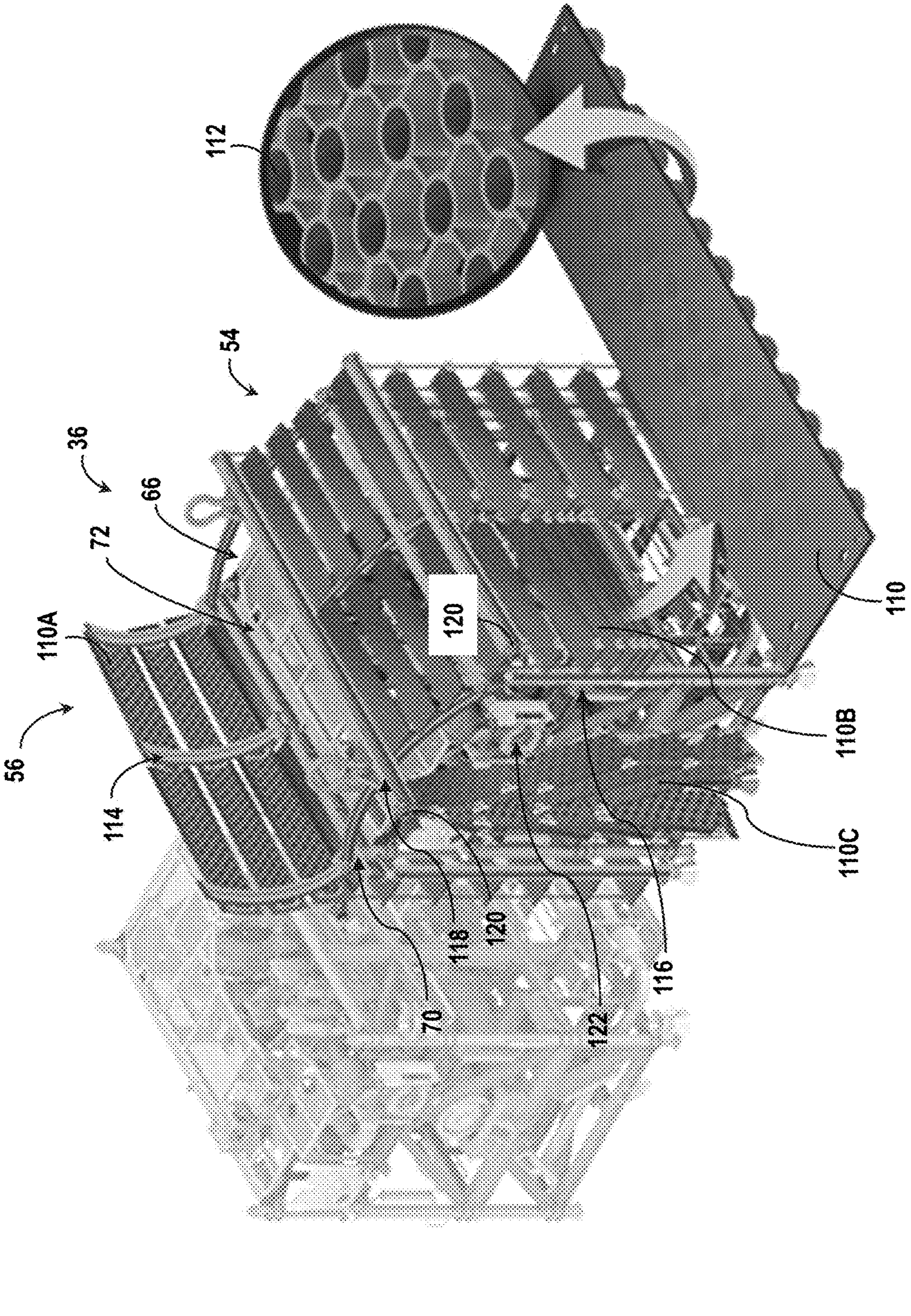
FIG. 3 is an example of the subsea compressor system of FIG. 1 fitted with a deepwater resonator array, in accordance with an embodiment of this disclosure.
Figure 4:
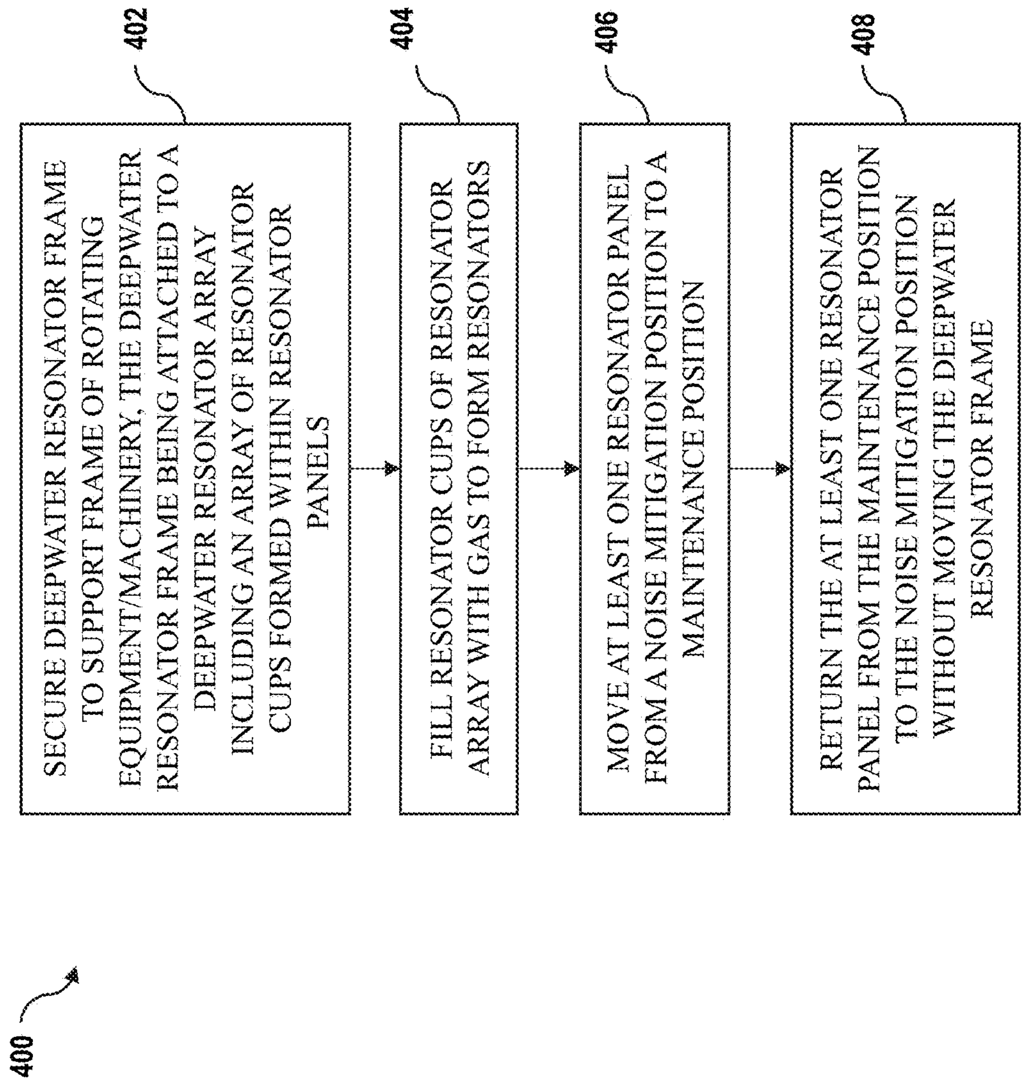
FIG. 4 is a process flow diagram illustrating an example method of mitigating long-term noise produced in a subsea oil and/or gas facility using a deepwater resonator array, in accordance with an embodiment of this disclosure.

The components of or associated with the noise mitigation system 54 may be further appreciated with respect to FIGS. 2-4. In FIG. 2, the subsea oil and/or gas facility 10 as illustrated includes a subsea compression system 36 having the noise mitigation system 54. The subsea compression system 36 may include a compression module 66 that the noise mitigation system 54 surrounds and/or to which the noise mitigation system 54 is attached. The compression module 66 may include a compression module support structure 72, one or more compressors 50, and other equipment 68 (e.g., piping, valves, instruments, cathodic protection, etc.). The module support structure 72 may be constructed from a material that is selected for use in a deepwater setting and may structurally support the compressor(s) 50 and other equipment 68 of the compression module 66.

In the illustrated embodiment, the noise mitigation system 54 has the resonator array 56 configured for deepwater use and having an array of resonators filled with gas to mitigate noise generated by the subsea compression system 36 (e.g., by the compression module 66). The resonator array 56 is generally supported by a resonator support structure 70, which may include a frame constructed from a material that is selected for use in a deepwater setting. The resonator support structure 70, in some embodiments, may surround the compression module 66, such as by surrounding the support structure 72 (e.g., support frame) of the compression module 66. The resonator support structure 70 (e.g., frame) of the noise mitigation system 54 may be connected to the support frame 72 of the compression module 66. Such a configuration places the resonator array 56 in position to mitigate the noise generated by the subsea compression module 66. As discussed in further detail with respect to FIG. 3, the frame 70 may include one more sections that place portions of the resonator array 56 in particular locations, orientations, and so forth.

As shown in FIG. 2, the noise mitigation system 54 may also include a resonator actuation system 74, which may include an actuation mechanism constructed from materials that are selected for use in a deepwater setting. The resonator actuation system 74 is coupled to the resonator support structure 70 and may include one or more devices (e.g., actuators) for selectively moving one or more parts (e.g., panels or groups of panels) of the resonator array 56 with respect to the compressor(s) 50 of the subsea compression system 36. The resonator actuation system 74 may be a mechanical actuation system including, for example, a winch, an interface comprising a receptacle for a torque tool, and the like. In another example, the resonator actuation system 74 may be an electrical actuation system including, for example, an electric motor powered via a cable extending from topsides equipment. In another example, the resonator actuation system 74 may be a hydraulic actuation system including, for example, a hydraulic piston. Any combination of the above types of actuation mechanisms may be used in the resonator actuation system 74 of FIG. 2.

As shown in FIG. 2, the noise mitigation system 54 may also include a resonator monitoring and control system 76. As discussed above, the noise mitigation system 54 may include a gas source 58 used for filling resonator cups of the resonator array 56. The resonator control system 76 may be communicatively coupled with the gas source 58 and configured to control the gas source 58 in response to sensor signals and/or commands received from topsides equipment of the subsea oil and/or gas facility 10. In one example, the resonator control system 76 may be located subsea proximate the noise mitigation system 54. In another example, the resonator control system 76 may be located within or proximate the topsides equipment. The resonator control system 76 may be communicatively coupled to the gas source 58, for example, via an electric, hydraulic, or fiber optic connection, to communicate control signals to initiate a cup refill sequence to output gas from the gas source 58 into the resonator array 56.

The resonator control system 76 generally includes at least one processing component 78 and at least one memory component 80. The at least one memory component 80 is a non-transitory computer-readable medium containing instructions that, when executed by the at least one processing component, cause the resonator control system 76 to perform one or more operations. For example, the instructions in the at least one memory component 80, when executed by the at least one processing component, may cause the resonator control system 76 to output control signal(s) to the resonator actuation system 74 to move one or more portions of the resonator array 56 in response to commands from the topsides equipment received by the at least one processing component 78. The at least one memory component 80 may include instructions that, when executed by the at least one processing component 78, cause the resonator control system 76 to output control signal(s) to the gas source 58 to output gas for filling resonator cups of the resonator array 56 in response to sensor signals and/or commands from the topsides equipment received by the at least one processing component 78. The "sensor signals" may include either direct measurements (e.g., measuring the gas fill level in the resonator cups) and/or indirect measurements (e.g., overall station noise monitoring) indicative of the current gas fill level in the resonator array 56.

In some embodiments, the resonator monitoring and control system 76 may be communicatively coupled with the resonator actuation system 74 and configured to control the resonator actuation system 74 in response to commands received from topsides equipment of the subsea oil and/or gas facility 10. The resonator control system 76 is communicatively coupled to the resonator actuation system 74, for example, via an electric, hydraulic, or fiber optic connection, to communicate control signals for operating the resonator actuation system 74. The at least one memory component 80 may include instructions that, when executed by the at least one processing component 78, cause the resonator control system 76 to output control signal(s) to the resonator actuation system 74 to move one or more portions of the resonator array 56 in response to commands from the topsides equipment received by the at least one processing component 78. Such movement of the resonator array 56 by the resonator actuation system 74 may facilitate deployment (e.g., unfolding/independently lowering) of resonators to provide complete coverage of the compression module 66. Additionally or alternatively, the movement of the resonator array 56 by the resonator actuation system 74 may facilitate access for periodic intervention/maintenance activities on the compression module 66 without having to remove the entire noise mitigation system 54, for example, by opening roof hatches to allow a subsea control module to be removed from the top of the compression module 66. Although FIG. 2 shows the noise mitigation system 54 being used in the context of a subsea compression system 36, it should be understood that a similar arrangement of the noise mitigation system 54 (e.g., including resonator support structure 70, resonator actuation system 74, gas source 58, and/or resonator control system 76) may be used with a subsea pumping system (e.g., 34 of FIG. 1) or any other rotating equipment/machinery of a subsea oil and/or gas facility.

FIG. 3 shows an example subsea compression system 36 having a noise mitigation system 54 disposed around the rotating equipment/machinery (i.e., compression module 66 having one or more compressors 50). As illustrated, the noise mitigation system 54 includes a deepwater resonator array 56 and resonator array support structure (e.g., frame) 70. The frame 70 of the noise mitigation system 54 surrounds the compression module 66. The compression module 66 (and likewise a pump module having one or more pumps 46 as described above with reference to FIG. 1) may have one or more retrievable elements. As described above, the compression module 66 may include at least one compressor 50, as well as other equipment such as dedicated control module(s), piping, valves, instruments, cathodic protection, etc. Similarly, a pump module may include at least one pump (46), as well as other equipment such as valves and piping, etc. The compression module 66 is the main element within the compression system 36, and similarly the pump module is the main element within the pump system 34.

As shown in the illustrated embodiment, the deepwater resonator array 56 may include a plurality of panels 110 in which resonator cups 112 are formed. The plurality of panels 110 are attached to the frame 70 such that the deepwater resonator array 56 surrounds the compression module 66 on at least one side. In the illustrated embodiment, the panels 110 are attached to the frame 70 such that the deepwater resonator array 56 surrounds the compression module 66 on all four sides and the top (but not the bottom, which is located on a structure at the seabed). The frame 70 is configured to hold the plurality of panels 110 in a noise mitigation orientation in which the resonator cups 112 on the panels 110 each have an open end oriented toward the seabed to enable capture of gas for noise attenuation.

The deepwater resonator array 56 may include multiple groups of panels 110. The panels 110 in each group of panels 110 are connected to each other, either rigidly through the frame 70 or movably via a resonator actuation system coupled to the frame 70 to allow periodic access and/or intervention to the retrievable elements within the compression module 66.

The frame 70 of the noise mitigation system 54 may be positioned around the compression module support structure (e.g., module support frame) 72 of the compression module 66. The frame 70 of the noise mitigation system 54 may be connected to the module support frame 72 of the compression module 66. In some embodiments, the frame 70 may include multiple sections that are configured to hold different panels 110 (or different groups of panels 110). For example, the frame 70 of the noise mitigation system 54 may include a first section 114 and a second section 116, the first section 114 configured to hold at least a first panel 110A of the plurality of panels 110 and the second section 116 configured to hold at least a second panel 110B of the plurality of panels 110. The first section 114 may be openable in certain embodiments, as described further below. In addition, as shown, the frame 70 of the noise mitigation system 54 may include a third section 118 configured to hold at least a third panel 110C of the plurality of panels 110.

In some embodiments, the different sections 114/116/118 may be configured to hold their respective panels 110A/110B/110C at different relative orientations with respect to the compression module 66 and/or the seabed. For example, the first section 114 may be configured to hold the first panel(s) 110A in a first orientation, while the second section 116 may be configured to hold the second panel(s) 110B in a second orientation different from the first orientation. This may facilitate periodic access for intervention and/or maintenance of the compression module 66 as required while avoiding removal of the entire resonator array 70.

As discussed above, the noise mitigation system 54 may include at least one resonator actuation system (e.g., 74 of FIG. 2). The resonator actuation system(s) may be incorporated into the frame 70 and/or connected to one or more sections 114/116/118 of the frame 70. Each resonator actuation system may be configured to move the first panel 110A, the second panel 110B, the third panel 110C, or a combination thereof. In the illustrated embodiment, the noise mitigation system 54 includes multiple resonator actuation systems (e.g., each for moving a different group of panels).

In some embodiments, the resonator actuation system may be coupled to the frame 70 and configured to selectively move one or more sections of the frame 70 (and the attached panels 110) relative to the compression module 66. For example, in FIG. 3, one resonator actuation system may be configured to selectively move the first section 114 (and its panels 110A) away from the compression module 66. In some embodiments, the resonator actuation system may be coupled to the frame 70 and configured to selectively move one or more panels (or groups of panels) 110 relative to the frame 70 and the compression module 66. For example, in FIG. 3, resonator actuation systems may be configured to selectively move the second panels 110B relative to the stationary second section 116 of the frame 70 and the third panels 110C relative to the stationary third section 118 of the frame 70.

The resonator actuation system(s) may provide one or more movable sets of panels 110 within the subsea compression system 36. The resonator actuation system(s) may facilitate installation or periodic intervention on elements within the compression module 66 (e.g., a set of panels 110B that could be moved via cables) with primary actuation from a remotely operated vehicle (ROV) external to the compression system 36. To that end, the resonator actuation system may include an ROV interface 122 configured to allow an ROV to cause any one or a combination of the first panel 110A, the second panel 110B, and the third panel 110C, to move. The ROV interface 122 may include a receptacle for a torque tool of an ROV. In some embodiments, the resonator actuation system may include one or more winches 120 attached (e.g., via cables) to any one or a combination of the first panel 110A, the second panel 110B, and the third panel 110C. The resonator actuation systems shown in FIG. 3 are mechanical actuation systems. However, as discussed above, other types of actuation systems may be used in other embodiments without departing from the scope of this disclosure.

In some embodiments, one or more sections of the frame 70 of the noise mitigation system 54 may be selectively movable with respect to the compression module 66. As shown in FIG. 3, for example, the first section 114 of the frame 70 may be hinged or retractable to allow the first section 114 to be rotated away from the compression module 66 and thereby allow access to intervene on retrievable elements within the compression module 66 while the remaining sections (e.g., 116, 118, etc.) of the frame 70 remain stationary. A resonator actuation system may cause this movement of the first section 114 of the frame 70. The first panel 110A may be fixedly attached to the first section 114 of the frame 70 such that the first panel 110A is unable to move relative to the first section 114 of the frame 70. As such, during movement of the first section 114 of the frame 70, the panel (or group of panels) 110A attached to the first section 114 remains in a substantially stationary position and orientation with respect to one another. As such, movement of the section 114 of the frame 70 from a noise mitigation position to a maintenance position moves all panels 110A away from the compression module 66 simultaneously.

One or more other sections of the frame 70 may remain stationary with respect to the compression module 66 while allowing for their attached panels 110 to be retracted. For example, in FIG. 3, the second panel(s) 110B of the deepwater resonator array 56 are attached to each other and to the second section 116 of the frame 70 via a resonator actuation system. The resonator actuation system includes a group of cables that can be pulled upward on winches 120 attached to the second section 116 of the frame 70 to retract the second panel(s) 110B. The retractable cables may be attached to both opposing ends of each second panel 110B. As illustrated, the group of panels 110B attached to the second section 116 of the frame 70 may be pulled upward and collapsed like a set of blinds, thereby allowing access to the compression module 66 while one or more other sections of the frame 70 remain stationary. As such, the second panel 110B may be attached to the second section 116 of the frame 70 in a configuration allowing movement in a direction that retracts the second panel 110B away from the compression module 66.

As another example, the third panel 110C (or group of panels) of the deepwater resonator array 56 are attached to each other and to the third section 118 of the frame 70 via a resonator actuation system. The resonator actuation system includes one or more cables that can be pulled upward on a winch 120 attached to the third section 118 of the frame 70 to retract the third panel(s) 110C. The retractable cable(s) may be attached to only one side of each third panel 110C, as shown. As illustrated, the group of panels 110C attached to the third section 118 of the frame 70 may be rotated and collapsed on themselves as their ends are pulled upward to facilitate deployment of the panels 110C onto the compression module 66 or to allow access to retrievable elements within the compression module 66 while one or more other sections of the frame 70 remain stationary. As such, the third panel 110C may be attached to the third section 118 of the frame 70 in a configuration allowing movement in a direction that retracts the third panel 110C away from the compression module 66.

Although FIG. 3 shows the noise mitigation system 54 being used in the context of a subsea compression system 36, it should be understood that a similar arrangement of the noise mitigation system 54 (e.g., including multiple panels 110, frame 70 with or without different sections, resonator actuation system(s), etc.) may be used with a subsea pumping system (e.g., 34 of FIG. 1) or any other rotating equipment/machinery of a subsea oil and/or gas facility.

FIG. 4 is a process flow diagram illustrating an example method 400 of mitigating long-term noise produced in a subsea oil and/or gas facility using a deepwater resonator array. As discussed above, the subsea oil and/or gas facility includes rotating equipment/machinery (e.g., pumping equipment/machinery having one or more pumps, compression equipment/machinery having one or more compressors, or both) for processing oil and/or gas generated by the subsea oil and/or gas facility. The method 400 includes blocks 402-408 shown in FIG. 4. It should be noted that in certain embodiments, the method 400 may not include every step shown in FIG. 4, the method 400 may include additional steps not shown in FIG. 4, and/or the steps of the method 400 may be performed in different orders than shown in FIG. 4, without departing from the scope of this disclosure.

At block 402, the method 400 includes securing a deepwater resonator frame to a support frame of the rotating equipment/machinery. The deepwater resonator frame is attached to a deepwater resonator array including an array of resonator cups formed within resonator panels. The resonator cups are capable of being filled with gas. Securing (402) the deepwater resonator frame to the support frame places the deepwater resonator array sufficiently proximate the rotating equipment/machinery to enable resonators of the deepwater resonator array to mitigate the noise generated by the rotating equipment/machinery during operation. In some embodiments, securing (402) the deepwater resonator frame to the support frame is done after deployment of the rotating equipment/machinery in a deepwater environment. In other embodiments, securing (402) the deepwater resonator frame to the support frame is done before deployment of the rotating equipment/machinery in a deepwater environment. At block 404, the method 400 includes filling the resonator cups with a gas to form resonators. The resonators are configured to mitigate noise generated by the rotating equipment/machinery during operation.

At block 406, the method 400 may include moving at least one resonator panel of the resonator panels from a noise mitigation position to a maintenance position. This movement (406) may be performed via an actuation mechanism integrated into the deepwater resonator frame that allows the resonator panels to move relative to the deepwater resonator frame. The maintenance position allows greater access to the rotating equipment/machinery from outside of the deepwater resonator frame than the noise mitigation position. At block 408, the method 400 may include returning the at least one resonator panel from the maintenance position to the noise mitigation position without moving the deepwater resonator frame. The resonator panel(s) may be returned (408) from the maintenance position to the noise mitigation position after performing maintenance, or after an inspection on the rotating equipment/machinery.

It will be understood that various modifications may be made to the embodiments disclosed herein. Therefore, the above description should not be construed as limiting, but merely as exemplifications of example embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

The invention claimed is:

1. A subsea oil and/or gas facility comprising:

rotating equipment/machinery located subsea and configured for subsea use, the rotating equipment/machinery comprising pumping equipment/machinery having one or more pumps, or compression equipment/machinery having one or more compressors, or both, for processing oil and/or gas generated by the subsea oil and/or gas facility; and a noise mitigation system configured for deepwater use and configured to mitigate noise generated by the rotating equipment/machinery, wherein the noise mitigation system comprises a deepwater resonator array configured for deepwater use and comprising an array of resonators filled with gas to mitigate the noise, wherein the rotating equipment/machinery is installed on the seabed, and wherein the noise mitigation system is configured to be coupled to the rotating equipment/machinery such that the noise mitigation system is located entirely beneath a sea surface and the deepwater resonator array surrounds the rotating equipment/machinery on at least one side and above a top of the rotating equipment/machinery.

2. The subsea oil and/or gas facility of claim 1, wherein the noise mitigation system further comprises a frame surrounding the rotating equipment/machinery, and wherein the deepwater resonator array comprises a plurality of panels in which resonator cups are formed, the plurality of panels being attached to the frame such that the deepwater resonator array surrounds the rotating equipment/machinery on the at least one side and above the top of the rotating equipment/machinery, and wherein the frame is configured to hold the plurality of panels in a noise mitigation orientation in which the resonator cups have an open end oriented toward the seabed to enable capture of gas for noise attenuation.

3. The subsea oil and/or gas facility of claim 2, wherein the frame of the noise mitigation system is positioned around a module support frame of the rotating equipment/machinery.

4. The subsea oil and/or gas facility of claim 3, wherein the frame of the noise mitigation system is connected to the module support frame of the rotating equipment/machinery.

5. The subsea oil and/or gas facility of claim 2, wherein the frame of the noise mitigation system comprises a first section and a second section, the first section being configured to hold a first panel of the plurality of panels and the second section being configured to hold a second panel of the plurality of panels.

6. The subsea oil and/or gas facility of claim 5, wherein the first section is configured to hold the first panel of the plurality of panels in a first orientation and the second section is configured to hold the second panel of the plurality of panels in a second orientation different from the first.

7. The subsea oil and/or gas facility of claim 5, wherein the first section is hinged or retractable to allow the first section to be rotated away from the rotating equipment/machinery and thereby allow access to the rotating equipment/machinery while remaining sections of the frame remain stationary and while the noise mitigation system remains entirely beneath the sea surface.

8. The subsea oil and/or gas facility of claim 5, wherein the first panel is fixedly attached to the first section such that the first panel is unable to move relative to the first section of the frame, and the second panel is attached to the second section in a configuration allowing movement in a direction that retracts the second panel away from the rotating equipment/machinery.

9. The subsea oil and/or gas facility of claim 5, wherein the noise mitigation system comprises a resonator actuation system configured to move either or both of the first panel and the second panel.

10. The subsea oil and/or gas facility of claim 9, wherein the resonator actuation system comprises one or more winches attached to either or both of the first panel and the second panel.

11. The subsea oil and/or gas facility of claim 9, wherein the resonator actuation system comprises a remotely operated vehicle (ROV) interface configured to allow an ROV to cause the first panel, the second panel, or both, to move.

12. The subsea oil and/or gas facility of claim 11, wherein the ROV interface comprises a receptacle for a torque tool of the ROV.

13. The subsea oil and/or gas facility of claim 9, wherein the resonator actuation system is coupled to the frame and configured to selectively move one or both of the first section and the second section of the frame relative to the rotating equipment/machinery.

14. The subsea oil and/or gas facility of claim 1, wherein the noise mitigation system further comprises:

a gas source; and a control system communicatively coupled with the gas source and configured to control the gas source in response to sensor signals and/or commands received from topsides equipment of the subsea oil and/or gas facility.

15. The subsea oil and/or gas facility of claim 1, wherein the noise mitigation system is permanently installed beneath the sea surface for the operating life of the rotating equipment/machinery.

16. A method of mitigating long-term noise produced in a subsea oil and/or gas facility comprising rotating equipment/machinery located subsea and configured for subsea use, the rotating equipment/machinery comprising pumping equipment/machinery having one or more pumps, or compression equipment/machinery having one or more compressors, or both, for processing oil and/or gas generated by the subsea oil and gas facility, the method comprising:

securing a deepwater resonator frame to a module support frame of the rotating equipment/machinery, the deepwater resonator frame being attached to a deepwater resonator array comprising an array of resonator cups formed within resonator panels, the resonator cups being capable of being filled with gas; and filling the resonator cups with a gas to form resonators, the resonators being configured to mitigate noise generated by the rotating equipment/machinery during operation; and wherein securing the deepwater resonator frame to the module support frame places the deepwater resonator array such that the deepwater resonator array surrounds the rotating equipment/machinery on at least one side and above a top of the rotating equipment/machinery and sufficiently proximate the rotating equipment/machinery to enable resonators of the deepwater resonator array to mitigate the noise generated by the rotating equipment/machinery during operation, and wherein the deepwater resonator array is configured to be located entirely beneath a sea surface during operation of the rotating equipment/machinery with the rotating equipment/machinery installed on the seabed.

17. The method of claim 16, comprising:

moving at least one resonator panel of the resonator panels from an initial position to a noise mitigation position via an actuation mechanism integrated into the deepwater resonator frame that allows the resonator panels to move relative to the deepwater resonator frame, the initial position maintaining the at least one resonator panel in a collapsed position proximate one or more other resonator panels while the deepwater resonator frame is secured to the module support frame.

18. The method of claim 16, comprising:

moving at least one resonator panel of the resonator panels from a noise mitigation position to a maintenance position via an actuation mechanism integrated into the deepwater resonator frame that allows the resonator panels to move relative to the deepwater resonator frame, the maintenance position allowing greater access to the rotating equipment/machinery from outside of the deepwater resonator frame than the noise mitigation position; and returning the at least one resonator panel from the maintenance position to the noise mitigation position without moving the deepwater resonator frame.

19. The method of claim 18, comprising returning the at least one resonator panel from the maintenance position to the noise mitigation position after performing maintenance, or an inspection on the rotating equipment/machinery.

20. The method of claim 16, wherein securing the deepwater resonator frame to the module support frame is done after installation of the rotating equipment/machinery on the seabed.

21. The method of claim 16, wherein securing the deepwater resonator frame to the module support frame is done before installation of the rotating equipment/machinery on the seabed.

* * * * *